(12) United States Patent
Luo et al.

(10) Patent No.: US 7,839,563 B1
(45) Date of Patent: Nov. 23, 2010

(54) ELECTROPHORETIC DISPLAY DEVICE

(75) Inventors: Ying Luo, Shenzhen (CN); Kuan-Hong Hsieh, Taipei Hsien (TW); Chun-Wei Pan, Taipei Hsien (TW)

(73) Assignees: Hong Fun Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/768,702

(22) Filed: Apr. 27, 2010

(30) Foreign Application Priority Data

Sep. 24, 2009 (CN) .......................... 2009 1 0307654

(51) Int. Cl.
  G02B 26/00 (2006.01)
  G09G 3/34 (2006.01)
(52) U.S. Cl. .................... 359/296; 359/228; 359/452; 345/107; 345/60; 345/88; 345/182
(58) Field of Classification Search ................. 359/296, 359/228, 452, 245; 345/55, 60, 88, 107, 345/214
See application file for complete search history.

(56) References Cited

U.S. PATENT DOCUMENTS

| | | | |
|---|---|---|---|
| 6,822,783 B2 * | 11/2004 | Matsuda et al. ............. | 359/296 |
| 7,339,716 B2 * | 3/2008 | Ding et al. .................. | 359/296 |
| 7,365,732 B2 * | 4/2008 | Matsuda et al. ............. | 345/107 |
| 7,397,597 B2 * | 7/2008 | Verschueren et al. ........ | 359/296 |
| 7,492,505 B2 * | 2/2009 | Liang et al. ................. | 359/296 |
| 7,535,539 B2 * | 5/2009 | Sakurai et al. .............. | 349/155 |
| 7,557,982 B2 * | 7/2009 | Shoji et al. .................. | 359/296 |
| 7,605,899 B2 * | 10/2009 | Shikina et al. .............. | 349/149 |
| 7,679,813 B2 * | 3/2010 | Liang et al. ................. | 359/296 |
| 7,710,389 B2 * | 5/2010 | Kazmaier et al. ........... | 345/107 |

\* cited by examiner

Primary Examiner—Loha Ben
(74) Attorney, Agent, or Firm—Zhigang Ma

(57) ABSTRACT

An electrophoretic display device includes a plurality of pixel electrodes arranged on a lower substrate, and an upper substrate having a common electrode that covers an entire area corresponding to a display surface. The electrophoretic display device further includes an electrophoretic ink layer having a plurality of cavities. Each of the cavities contains suspension fluid and a plurality of charged pigment particles dispersing in the suspension fluid. The electrophoretic display device also includes a plurality of pixel units, each of which includes three of the plurality of cavities. Each of the three cavities contains the black particles and particles of the red particles, green particles, or blue particles, respectively.

9 Claims, 2 Drawing Sheets

ELECTROPHORETIC DISPLAY DEVICE

BACKGROUND

1. Technical Field

The present disclosure relates to electrophoretic display devices and, more particularly, to a color electrophoretic display device.

2. Description of Related Art

Electrophoretic effects are well known among scientists and engineers, wherein charged particles dispersed in a fluid or liquid medium move under the influence of an electric field. As an example of the application of the electrophoretic effects, engineers try to realize displays by using charged pigment particles that are dispersed and contained in dyed solution arranged between a pair of electrodes. Under the influence of an electric field, the charged pigment particles are attracted to one of the electrodes, so that desired images will be displayed. The dyed solution in which charged pigment particles are dispersed is called electrophoretic ink, and the display using the electrophoretic ink is called an electrophoretic display (abbreviated as EPD). It is desirable to provide a new type of color electrophoretic display that can display images in purer colors.

BRIEF DESCRIPTION OF THE DRAWINGS

The components in the drawings are not necessarily drawn to scale, the emphasis instead being placed upon clearly illustrating the principles of the electrophoretic display device. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
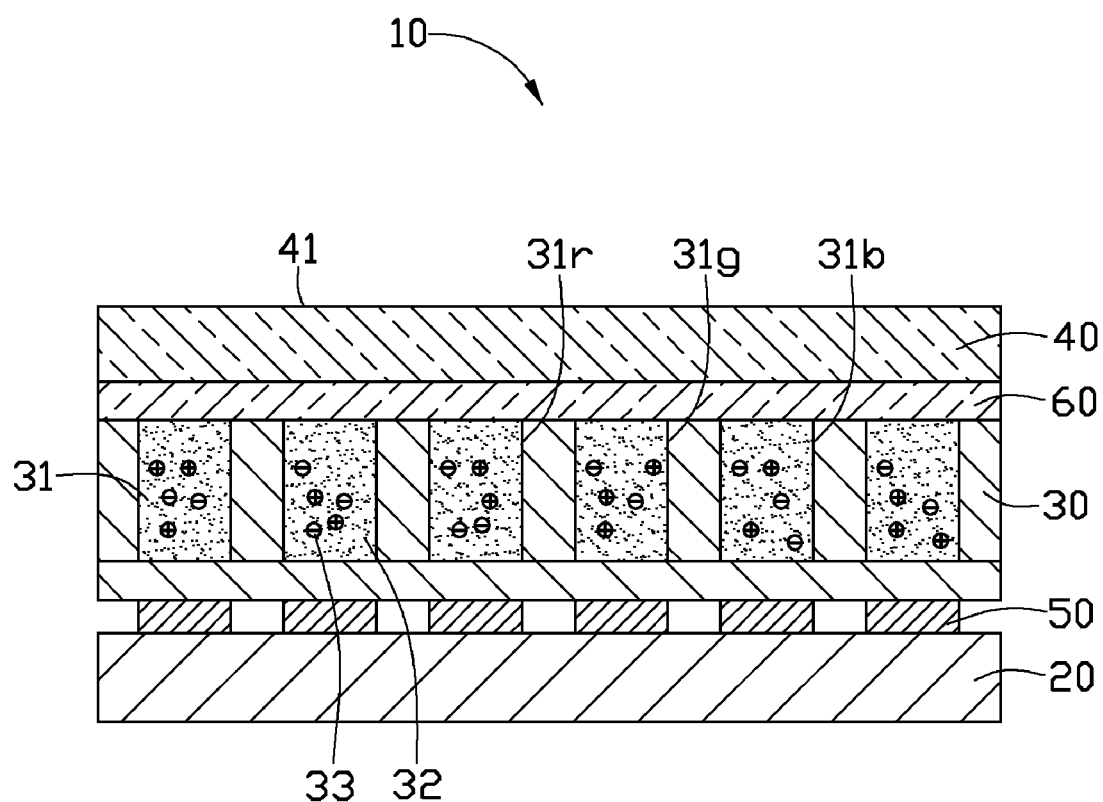
FIG. 1 is a schematic, cross-sectional view showing an electrophoretic display device in accordance with an exemplary embodiment.

Referring to FIG. 1, an electrophoretic display device 10 includes a lower substrate 20, an electrophoretic ink layer 30, and an upper substrate 40. The electrophoretic ink layer 30 is arranged between the lower substrate 20 and the upper substrate 40.

The lower substrate 20 can be made of plastic, or glass. A plurality of pixel electrodes 50 are formed between the electrophoretic ink layer 30 and the lower substrate 20.

A transparent electrode 60 is formed between the upper substrate 40 and the electrophoretic ink layer 30, which corresponds to a display surface 41 of the substrate 40 to be viewed by a person. The transparent electrode 60 is used as a common electrode. The transparent electrode 60 can be made of indium tin oxide.

The electrophoretic ink layer 30 includes a plurality of tubular cavities 31. In the exemplary embodiment, the tubular cavities 31 are parallel to each other and are perpendicular to the display surface 41. The tubular cavities 31 are arranged in a matrix pattern.

Each tubular cavity 31 is formed above one pixel electrode 50 that is arranged above the lower substrate 20. Each tubular cavity 31 contains suspension fluid 32 and charged pigment particles 33 dispersed in the suspension fluid 32. The charged pigment particles 33 include black particles, red particles, green particles, and blue particles.

Upon applying voltage between the pixel electrodes 50 and the transparent electrode 60, the charged pigment particles 33 are controlled to move to the transparent electrode 60 to form images displayed on the display device 10.

Figure 2:
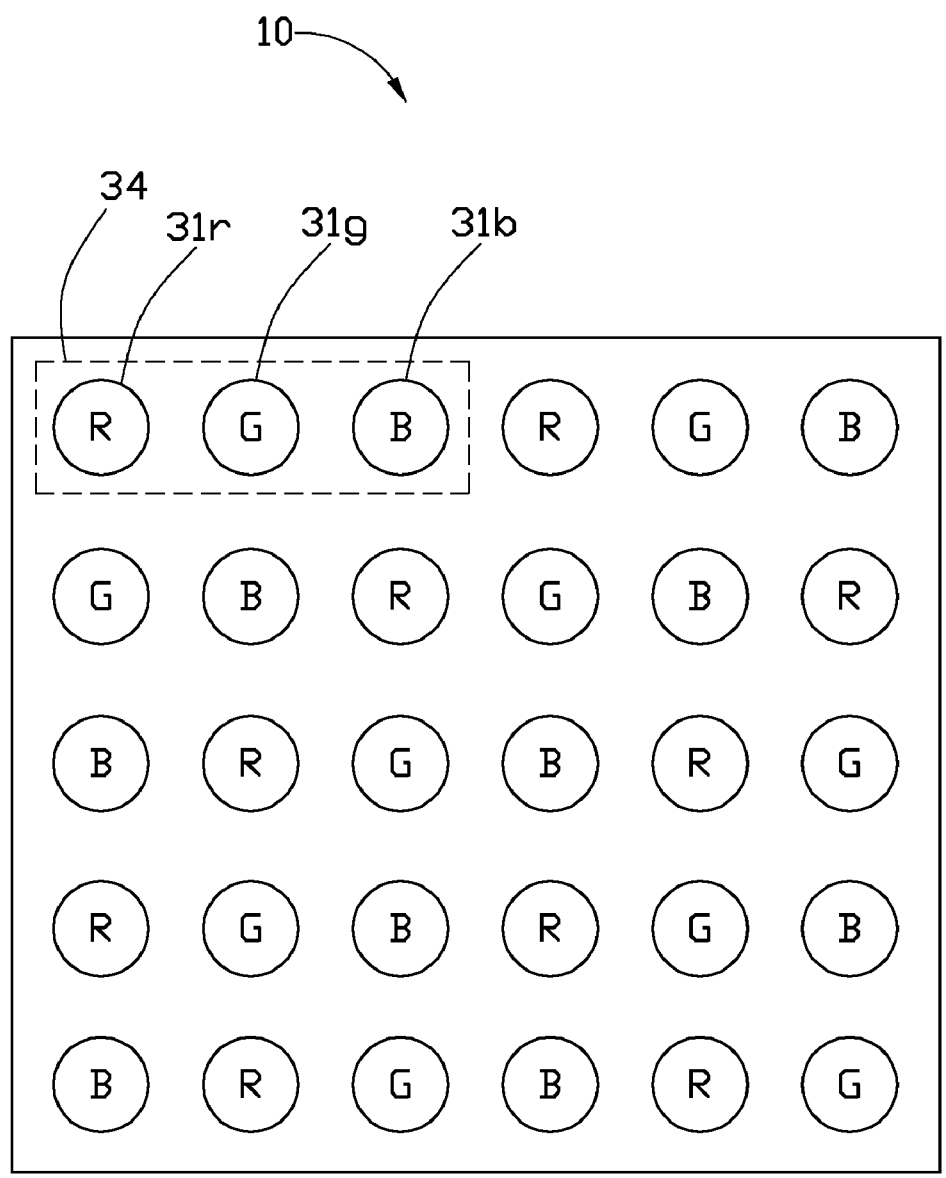
FIG. 2 is a schematic, planar view of the electrophoretic display device of FIG. 1.

Referring to FIG. 2, each pixel unit 34 of the display device 10 includes three tubular cavities 31r, 31g, and 31b. In another embodiment, the cavities 31r, 31g, and 31b may be defined in microcapsules applied onto the transparent electrode 60.

All of the tubular cavities 31r, 31g, and 31b contain black particles. The tubular cavities 31r, 31g, and 31b also contain red, green, and blue particles, respectively. The manner of arrangement of the three tubular cavities 31r, 31g, and 31b is not limited. For example, as shown in FIG. 2, the cavities 31r, 31g, and 31b are arranged from left to right in the pixel in the upper left corner, while the cavities 31b, 31r, and 31g are arranged from left to right in the pixel in the lower right corner.

The black particles in each of the cavities 31r, 31g, and 31b have polarities opposite to that of the red, green, and blue particles. In the embodiment, the black particles are negatively charged, while the red, green, and blue particles are positively charged. When a positive voltage is applied, the black particles are driven to move toward the transparent electrode 60, and the red, green, and blue particles are driven to move toward the pixel electrodes 50. When a negative voltage is applied, the black particles are driven to move toward the pixel electrodes 50, and the red, green, and blue particles are driven to move toward the transparent electrode 60.

To form a desired colorful image, certain pixel units 34 each need to display a predetermined color. Take a pixel unit 34 needing to display yellow for example, the cavity 31b containing the black particles and the blue particles has a positive voltage applied, the black particles thus move toward the transparent electrode 60, which causes the cavity 31b to be black. The cavities 31r and 31g are applied negative voltages, the red and green particles thus move toward the transparent electrode 60. The cavities 31r and 31g thus display red and green, respectively. The pixel unit 34 thus displays yellow according to color theory basics.

Each pixel unit 34 can display different colors by applying voltages of different amplitude to the cavities 31r, 31g, and 31b. This is because voltages of different amplitude will drive different amount of particles moving toward the transparent electrode 60. The cavities 31r, 31g, and 31b can thus display colors of different levels. The pixel unit 34 can thus display different colors by combining the colors displayed by the cavities 31r, 31g, and 31b. In other embodiments, a pulse width modulation driving method may be used. Specifically, by applying driving pulses of different pulse widths to the cavities 31r, 31g, and 31b, different amount of particles are driven toward the transparent electrode 60. In yet another embodiment, a pulse rate modulation driving method may be used. Specifically, by applying different numbers of driving pulses to each cavities 31r, 31g, and 31b, in a finite driving period that is the same for each of the cavities 31r, 31g, and 31b, different amount of particles are driven toward the transparent electrode 60.

Because the black particles in cavities 31r, 31g, and 31b do not reflect light, the use of black particles can assist to produce purer color in each pixel unit 34. For example, assuming that no such black particles exist in each of the cavities 31r, 31g, and 31*b*, when attempting to cause the pixel unit 34 to display yellow, the blue particles are controlled to move toward the pixel electrode 50, while the red and green particles are controlled to move toward the transparent electrode 60. Although the blue particles gather around the pixel electrode 50, more or less, they still reflect blue light through the transparent electrode 60, which will affect the mixing of the red color and green color displayed by the cavities 31*r*, 31*g*. The pixel unit 34 may display off-color yellow, rather than pure yellow. In contrast, the black particles gathering around the transparent electrode 60 reflect almost no blue light. This ensures that the mixing of the red color and green color displayed by the cavities 31*r* and 31*g* will not be affected by the blue cavity 31*b*, and that the pixel unit 34 displaying a pure yellow color.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An electrophoretic display device comprising:
    a plurality of pixel electrodes arranged on a lower substrate;
    an upper substrate having a common electrode that covers an area corresponding to a display surface of the electrophoretic display device;
    an electrophoretic ink layer comprising a plurality of cavities and each of the cavities containing a suspension fluid and a plurality of charged pigment particles dispersing in the suspension fluid; and
    a plurality of pixel units, wherein each pixel unit comprises three of the plurality of cavities, each of the three cavities contains black particles and red particles, green particles, or blue particles, respectively.

2. The electrophoretic display device according to claim 1, wherein each of the plurality of cavities is tubular.

3. The electrophoretic display device according to claim 2, wherein the cavities are formed perpendicular to the display surface.

4. The electrophoretic display device according to claim 2, wherein the plurality of cavities are parallel to each other.

5. The electrophoretic display device according to claim 1, wherein the common electrode is made of indium tin oxide.

6. The electrophoretic display device according to claim 1, wherein the plurality of cavities are arranged in a matrix pattern.

7. The electrophoretic display device according to claim 1, wherein the lower substrate is made of glass or plastic.

8. The electrophoretic display device according to claim 1, wherein the black particles have polarities opposite to polarities of the red particles, green particles, and blue particles.

9. The electrophoretic display device according to claim 1, wherein the black particles are negatively charged, and red, green, and blue particles are positively charged.

* * * * *

UNITED STATES PATENT AND TRADEMARK OFFICE
CERTIFICATE OF CORRECTION

PATENT NO. : 7,839,563 B1
APPLICATION NO. : 12/768702
DATED : November 23, 2010
INVENTOR(S) : Ying Luo, Kuan-Hong Hsieh and Chun-Wei Pan Page 1 of 1

It is certified that error appears in the above-identified patent and that said Letters Patent is hereby corrected as shown below:

Title Page, should read as follows:

Item (73) Assignees: Hong Fu Jin Precision Industry (ShenZhen) Co., Ltd., Shenzhen, Guangdong Province (CN); Hon Hai Precision Industry Co. Ltd., Tu-Cheng, Taipei Hsien (TW).

Signed and Sealed this
First Day of February, 2011

David J. Kappos
*Director of the United States Patent and Trademark Office*